No. 788,294. PATENTED APR. 25, 1905.
A. Q. WALSH.
COVER FOR RECEPTACLES.
APPLICATION FILED DEC. 16, 1904.

WITNESSES:

INVENTOR
Arthur Quinton Walsh
BY
ATTORNEYS

No. 788,294. Patented April 25, 1905.

UNITED STATES PATENT OFFICE.

ARTHUR QUINTON WALSH, OF NEW YORK, N. Y.

COVER FOR RECEPTACLES.

SPECIFICATION forming part of Letters Patent No. 788,294, dated April 25, 1905.

Application filed December 16, 1904. Serial No. 237,169.

*To all whom it may concern:*

Be it known that I, ARTHUR QUINTON WALSH, a subject of the King of Great Britain, and a resident of the city of New York, borough of Manhattan, in the county and State of New York, have invented a new and Improved Cover for Receptacles, of which the following is a full, clear, and exact description.

The purpose of the invention is to provide a cover for receptacles, especially such as are adapted to contain tobacco, cigars, or cigarettes, and to so construct the cover that it can be simply slipped over the neck of the receptacle, closing said receptacle in practically a liquid and air tight manner and enabling the cover to be quickly and conveniently removed or placed in closing position on the receptacle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
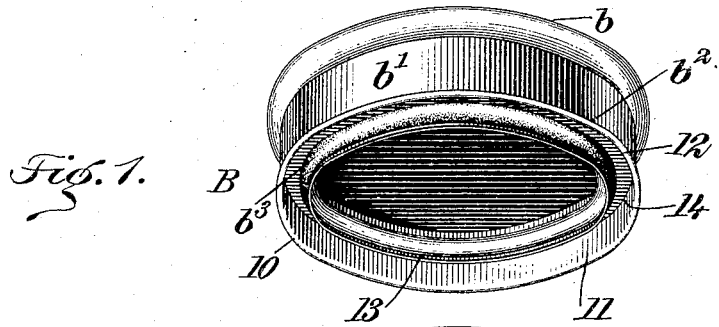
Figure 2:
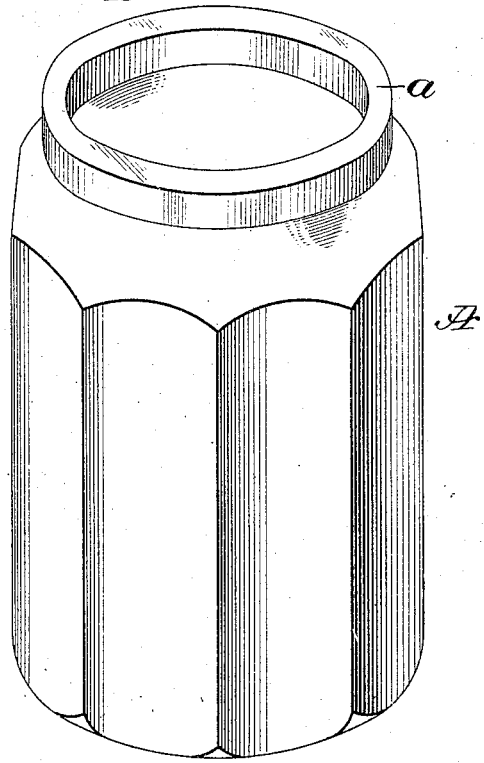
Figure 3:
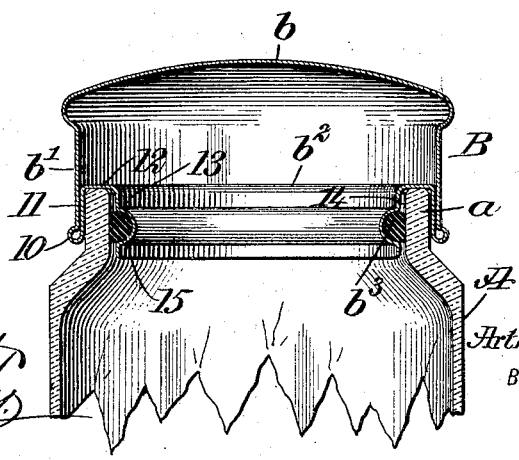

Figure 1 is a perspective view of the improved cover viewed from the bottom. Fig. 2 is a perspective view of a receptacle adapted to receive the cover, and Fig. 3 is a vertical section through the upper portion of the receptacle and the cover in sealing position thereon.

The receptacle A may be made of any desired material, glass being usually employed, and the neck $a$ is plain or unthreaded at both its inner and its outer face. The cover B may likewise be made of any approved material; but sheet metal is preferred. The cover is shown as being made of one piece, and in detail it consists of a top section $b$, an annular side section $b'$, and an inner receiving-section $b^2$, which receives not only the neck $a$ of the receptacle, but also a washer $b^3$, of rubber or other yielding material, which washer when the cover is in place engages more or less forcibly with the inner face of the said neck, as is shown in Fig. 3.

The receiving-section $b^2$ is formed by bending the material up within the cover proper at the bottom in such manner as to produce a strengthening rib or bead 10 at the outer bottom edge of the cover and an inner wall 11, which is close to the side $b'$. Then the material is bent horizontally inward from the top of the inner vertical wall 11, forming an upper inner wall 12, and from thence the material is again carried downward, producing an innermost vertical wall 13, which extends farther downward than the lower edge of the rib or bead 10. This construction also forms an inverted-U-shaped pocket 14, into which the neck $a$ of the receptacle A extends when the cover is in position thereon. With reference to the walls 11 and 13 the wall 11 will be hereinafter referred to as the "intermediate" wall and the wall 13 as the "inner" wall of the cover.

In the construction of the inner wall 13 an annular groove 15 is produced in its outer face, and the washer $b^3$, above referred to, which is usually in the form of a ring, is sprung into the said groove. Therefore the cover can be simply slipped upon or slipped from the neck of the receptacle, and when the cover is in position on the neck $a$ the engagement of the washer with the neck provides for an air and vapor tight seal, preserving the contents of the receptacle from exposure to the atmosphere and tending to preserve moisture. It may also be stated that the cover can be placed noiselessly upon the receptacle and noiselessly removed therefrom.

Having thus described my invention, I claim as new and desire to secure by Letters Patent—

1. As an improved article of manufacture, a cover for receptacles, provided with an inner inverted-U-shaped pocket at its lower side portion, which pocket has an annular recess in its inner wall and a yielding washer fitted to said recess and adapted to have bearing on the inner face of the receptacle, and whereby the outer face of the side portion of the cover may be substantially without projections.

2. A cover for receptacles, bent upon itself at its lower edge to form an upwardly-extending intermediate wall, an upper inner horizontal wall and a downwardly-extending inner wall, the space between the inner and intermediate walls being substantially inverted-U shape in cross-section, the inner wall having an annular groove in its outer face, and a washer sprung into the said groove, for the purpose described.

3. The combination with a receptacle having an annular neck, the surfaces of which neck are smooth, of a cover comprising a body portion bent upon itself at its lower edge to form a lower marginal bead, and an upwardly-extending intermediate wall close to the outer wall, an inner horizontal wall and a downwardly-extending inner wall, the inner wall having an annular groove produced in its outer face, the space between the intermediate and inner walls being adapted to receive the neck of the receptacle, and a washer of elastic material sprung into the recess in the inner wall, which washer engages with the inner face of the said neck, as described.

In testimony whereof I have signed my name to this specification in the presence of two subscribing witnesses.

ARTHUR QUINTON WALSH.

Witnesses:
RD. WENTWORTH HICKS,
JOHN J. GLENNON.